United States Patent
Coss, Jr. et al.

(10) Patent No.: US 8,321,048 B1
(45) Date of Patent: Nov. 27, 2012

(54) ASSOCIATING DATA WITH WORKPIECES AND CORRELATING THE DATA WITH YIELD DATA

(75) Inventors: Elfido Coss, Jr., Austin, TX (US); Anastasia O. Peterson, Spicewood, TX (US); Christopher A. Bode, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 601 days.

(21) Appl. No.: 10/185,468

(22) Filed: Jun. 28, 2002

(51) Int. Cl.
*G06F 19/00* (2011.01)

(52) U.S. Cl. .......................... 700/121; 700/96; 700/109

(58) Field of Classification Search ............... 700/96, 700/121, 108–110; 702/81, 84
See application file for complete search history.

(56) References Cited

U.S. PATENT DOCUMENTS

| | | | | |
|---|---|---|---|---|
| 5,539,752 A | * | 7/1996 | Berezin et al. | 714/724 |
| 5,761,065 A | * | 6/1998 | Kittler et al. | 700/117 |
| 5,856,923 A | * | 1/1999 | Jones et al. | 700/121 |
| 5,923,553 A | * | 7/1999 | Yi | 700/110 |
| 5,930,138 A | * | 7/1999 | Lin et al. | 700/108 |
| 5,940,300 A | * | 8/1999 | Ozaki | 700/121 |
| 5,993,043 A | * | 11/1999 | Fujii | 700/121 |
| 6,180,424 B1 | * | 1/2001 | Tigelaar et al. | 438/14 |
| 6,298,470 B1 | * | 10/2001 | Breiner et al. | 716/4 |
| 6,367,040 B1 | * | 4/2002 | Ott et al. | 714/724 |
| 6,389,323 B1 | * | 5/2002 | Yang et al. | 700/110 |
| 6,410,351 B1 | * | 6/2002 | Bode et al. | 438/14 |
| 6,662,070 B1 | * | 12/2003 | Conboy et al. | 700/121 |
| 6,728,591 B1 | * | 4/2004 | Hussey et al. | 700/121 |
| 6,766,208 B2 | * | 7/2004 | Hsieh | 700/109 |
| 7,082,345 B2 | * | 7/2006 | Shanmugasundram et al. | 700/121 |
| 2002/0069349 A1 | * | 6/2002 | Toprac | 712/224 |
| 2002/0193902 A1 | * | 12/2002 | Shanmugasundram et al. | 700/121 |
| 2003/0000922 A1 | * | 1/2003 | Subramanian et al. | 216/60 |
| 2003/0014145 A1 | * | 1/2003 | Reiss et al. | 700/121 |
| 2003/0052084 A1 | * | 3/2003 | Tabery et al. | 216/59 |
| 2004/0005507 A1 | * | 1/2004 | Lakkapragada et al. | 430/30 |
| 2006/0246683 A1 | * | 11/2006 | Pan et al. | 438/424 |

\* cited by examiner

*Primary Examiner* — Mohammad Ali
*Assistant Examiner* — Nathan Laughlin
(74) *Attorney, Agent, or Firm* — Williams, Morgan & Amerson, P.C.

(57) ABSTRACT

A method and apparatus is provided for associating operational data with workpieces and correlating the operational data with yield data. The method comprises processing a workpiece using a processing tool, associating the operational data with the workpiece during the processing of the workpiece and measuring the yield data associated with the processed workpiece. The method further comprises correlating the operational data with the yield data to make one or more determinations.

21 Claims, 3 Drawing Sheets

ASSOCIATING DATA WITH WORKPIECES AND CORRELATING THE DATA WITH YIELD DATA

BACKGROUND OF THE INVENTION

1. Field of the Invention

This invention relates generally to a semiconductor fabrication process, and, more particularly, to associating data with workpieces in the semiconductor fabrication process and correlating the data with yield data of the processed workpieces.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in continual improvements in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

During the fabrication process, various events may take place that affect the performance of the devices being fabricated. That is, variations in the fabrication process result in device performance variations. Factors, such as feature critical dimensions, doping levels, contact resistance, particle contamination, etc., may potentially affect the end performance of the device. Various tools in the processing line are controlled, in accordance with performance models, to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., which equates to increased profitability.

Semiconductor manufacturing processes, which have become increasingly more reliable and robust, may include a plurality of processing tools that cooperate with each other to process semiconductor devices, such as, microprocessors, memory devices, ASICs, etc. To verify that the processing tools are operating within acceptable parameters, it has become increasingly desirable to monitor the operating conditions of such processing tools.

During the manufacturing process, various metrology data is collected to allow automatic process control, fault detection and classification, defect identification and performance measurement. However, the data that is collected may oftentimes be inadequate for troubleshooting process defects. That is, the collected data may be inadequate to explain deviations in the yield of the processed workpieces, such as wafers.

The present invention is directed to overcoming, or at least reducing the effects of, one or more of the problems set forth above.

SUMMARY OF THE INVENTION

In one embodiment of the present invention, a method is provided for associating operational data with workpieces and correlating the operational data with yield data. The method comprises processing a workpiece using a processing tool, associating the operational data with the workpiece during the processing of the workpiece and measuring the yield data associated with the processed workpiece. The method further comprises correlating the operational data with the yield data to make one or more determinations.

In another embodiment of the present invention, an apparatus is provided for associating operational data with workpieces and correlating the operational data with yield data. The apparatus comprises an interface and a control unit. The interface is adapted to receive the operational data associated with a workpiece, wherein the workpiece is processed by a processing tool. The interface is further adapted to receive the yield data associated with the processed workpiece. The control unit, which is communicatively coupled to the interface, is adapted to correlate the operational data with the yield data to make one or more determinations.

In a further embodiment of the present invention, an article comprising one or more machine-readable storage media containing instructions is provided for associating operational data with workpieces and correlating the operational data with yield data. The one or more instructions, when executed, enable the processor to process a wafer using a processing tool, associate the operational data with the wafer during the processing of the wafer and measure the yield data associated with the processed wafer. The one or more instructions, when executed, further enable the processor to correlate the operational data with the yield data to determine yield impact on the processed wafer.

BRIEF DESCRIPTION OF THE DRAWINGS

The invention may be understood by reference to the following description taken in conjunction with the accompanying drawings, in which like reference numerals identify like elements, and in which.

Figure 1:
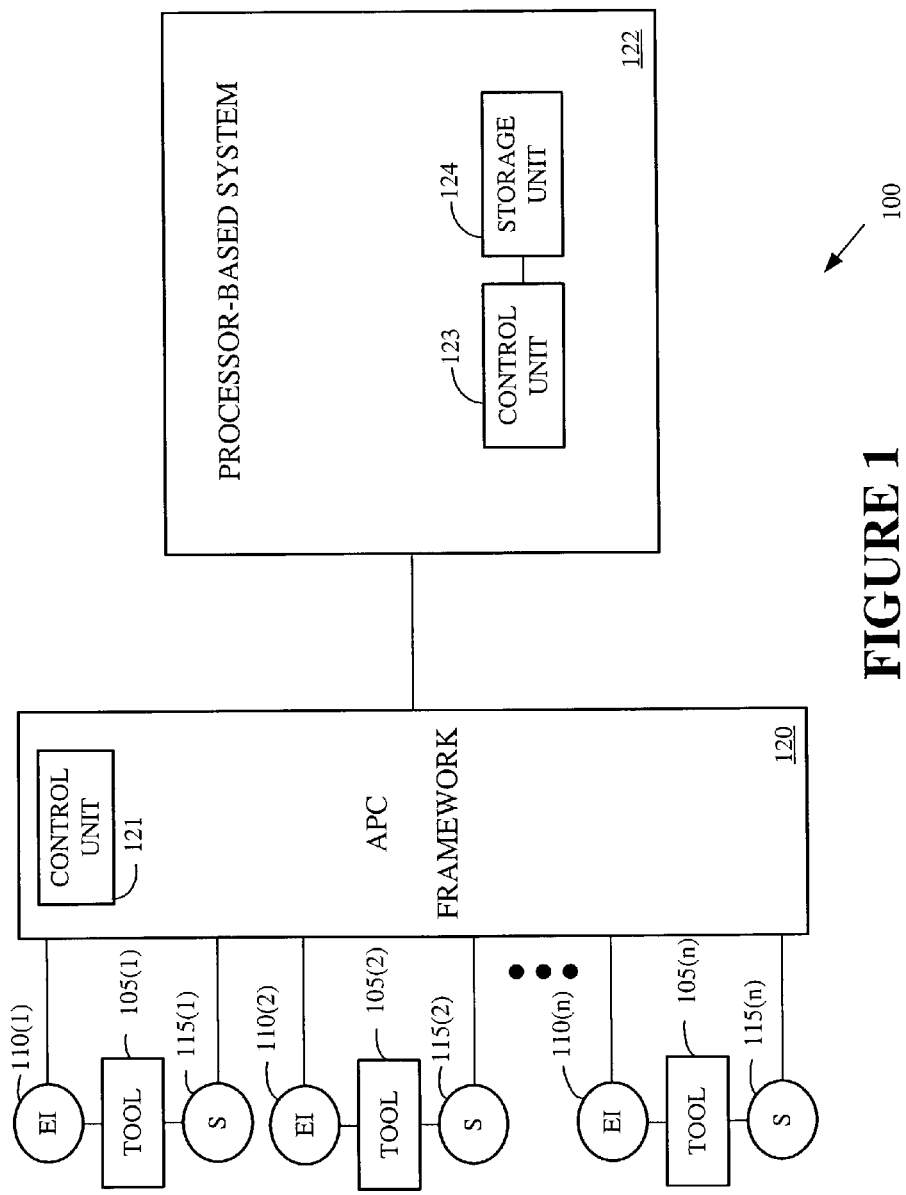
FIG. 1 illustrates a manufacturing system, including an Advanced Process Control (APC) framework, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a manufacturing system 100 for a semiconductor fabrication process is illustrated in accordance with one embodiment of the present invention. Although the invention is described as it may be implemented in a semiconductor fabrication facility, the invention is not so limited and may be applied to other manufacturing environments. The techniques described herein may be applied to a variety of workpieces including, but not limited to, microprocessors, memory devices, digital signal processors, application specific integrated circuits (ASICs), or other similar devices. The techniques may also be applied to workpieces other than semiconductor devices.

The system 100 includes a plurality of processing tools 105(1-n). In the illustrated embodiment, the processing tools 105(1-n) are coupled to respective equipment interfaces (EI) 110 (shown as EI 110(1-n) in FIG. 1). Each of the equipment interfaces 110 retrieves various operational data from its respective processing tool 105, and communicates this data to an Advanced Process Control (APC) framework 120 to determine whether the processing tool 105 is experiencing faulty operation. Each equipment interface 110 may further receive control signals from the APC framework 120 that may be used to control the respective processing tool 105. For example, a control signal from the APC framework 120 may be used to shut down the first processing tool 105(1) if the operational data that was sent by the first equipment interface 110(1) was deemed faulty by the APC framework 120. As utilized herein, the term "operational data" may include data related to the processing of the workpieces, metrology data, and the like.

Exemplary processing tools 105(1-n) for a semiconductor device fabrication environment include photolithography steppers, etch tools, deposition tools, polishing tools, rapid thermal processing tools, test-equipment tools, implantation tools, etc. In one embodiment, the processing tool 105 may be a multi-chambered processing tool.

In one embodiment, the processing tools 105(1-n) may be downstream to each other. That is, the second processing tool 105(2) may be downstream to the first processing tool 105(1), the third processing tool 105(3), (not shown), may be downstream to the second processing tool 105(2), and so forth. As such, a workpiece that is processed by the first processing tool 105(1) may, for example, be provided to the second processing tool 105(2), which may further process the workpiece before it is processed by the next processing tool 105(n). This process may continue until the last processing tool 105(n) has completed processing the workpiece.

The processing tools 105(1-n) of the system 100, in one embodiment, may perform various processing steps to create a packaged semiconductor device. For example, the processing tools 105(1-n) may be used for manufacturing the raw semiconductor material, slicing the semiconductor crystal ingot into individual wafers, fabricating (e.g., etching, doping, ion implanting) the wafers, testing and packaging the completed semiconductor devices, and the like. The number of processing tools 105(1-n) employed in the system 100 may be implementation specific, and thus may vary from one embodiment to another depending on the particular processing steps desired.

Generally, each processing tool 105 performs selected processing steps in accordance with a recipe defined for the workpiece to be processed in the processing tool 105. Furthermore, each recipe may define more than one processing step that can be performed by the processing tool 105. In one embodiment, the processing tool 105 may process a plurality of workpieces at any given time under the control of a recipe, where, for example, the workpieces may be at varying process stages as they are processed by the processing tool 105. The concept of accepting and then processing more than one workpiece at any given time is sometimes referred to as "batch processing." In the illustrated embodiment, the "workpieces" are semiconductor wafers that are capable of being processed by the processing tools 105(1-n).

The processing tools 105(1-n) may include one or more internal sensors (not shown) for measuring operational data, which may then be transmitted through the associated EI 110 of the processing tools 105(1-n). In addition to internal sensors, the processing tools 105 may also be coupled to respective external sensors 115(1-n). The sensors 115(1-n) measure additional operational data that may or may not be ascertained by the associated processing tool 105 itself. For example, the sensor 115 may be used to determine a temperature range or other environmental or ambient data near or around the associated processing tool 105. In alternative embodiments, the sensor 115 may be used to sense various other operational parameters associated with the processing tool 105, and, thus, need not be limited to the aforementioned examples. It should be appreciated that, in one embodiment, some or all of the features of the sensors 115(1-n) may be integrated within the processing tools 105(1-n) themselves.

The sensor 115 may be embodied as a simple data acquisition program, such as a C++ standalone program acquiring data from a thermocouple wire. Alternatively, the sensor 115 may be embodied as a full-fledged LABVIEW application, acquiring data through multiple transducers (not shown). It will further be appreciated that the sensor 115 need not be used at all, and the APC framework 120 may rely upon the operational data forwarded from the processing tool 105. If used, in one embodiment, the sensor 115 forwards the additional operational data to the APC framework 120 for analysis.

The APC framework 120 may be any one of a variety of arrangements that facilitates communications to and from the processing tools 105(1-n). An exemplary information exchange and process control framework suitable for use in the manufacturing system 100 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI. In one embodiment, the APC framework 120 may include a control unit 121 that manages the communications to and from the APC framework 120. The control unit 121 may also control the overall operations of one or more of the processing tools 105(1-n).

Wafers may take a variety of paths through the manufacturing system 100 as they are processed by various processing tools 105(1-n) before arriving at the final product. Often, after the wafers are processed, several measurements of the final product may be taken to determine if the final product is compliant with the desired specification. These measurements are hereinafter referred to as "yield data." Generally, if the yield data is outside the acceptable parameters, a fab technician may attempt to determine the source or cause of the process deviation in the manufacturing system 100. However, the ability to identify the source or cause of the process deviation may depend in part on the amount and type of data that is collected as the wafers were processed. Thus, a limited amount and type of collected data may inhibit or hamper the ability to properly identify the source of the problem that caused the undesirable results (e.g., process defects). In accordance with one or more embodiments of the present invention, and as is described in more detail below, a variety of types of operational data are collected during the processing of the wafers. This variety of types of operation data enables a fab technician to more readily identify the potential source(s) of process deviations that may have ultimately affected the desired yield.

The system 100 includes a processor-based system 122 having a control unit 123 and a storage unit 124. Although not shown, the processor-based system 122 may include an interface to communicatively couple with the processing tool 105 via the APC framework 120. The processor-based system 122 receives the operational data associated with the processing tools 105 and processes the data to determine if a fault occurred in the manufacturing system 100. For the purposes of this discussion, the operational data that is associated with the processing tool 105 may be received through the EI 110, the sensor 115, or any other desirable source.

It should be appreciated that the illustrated components shown in the block diagram of the system 100 in FIG. 1 are illustrative only, and that, in alternative embodiments, additional or fewer components may be utilized without deviating from the spirit or scope of the invention. For example, in one embodiment, the one or more processing tools 105 may not have an external sensor 115. Additionally, it should be noted that although various components, such as the equipment interface 110 of the system 100 of FIG. 1, are shown as stand-alone components, in alternative embodiments, such components may be integrated into the processing tool 105. Similarly, the processor-based system 122 may be integrated into the APC framework 120.

Figure 2:
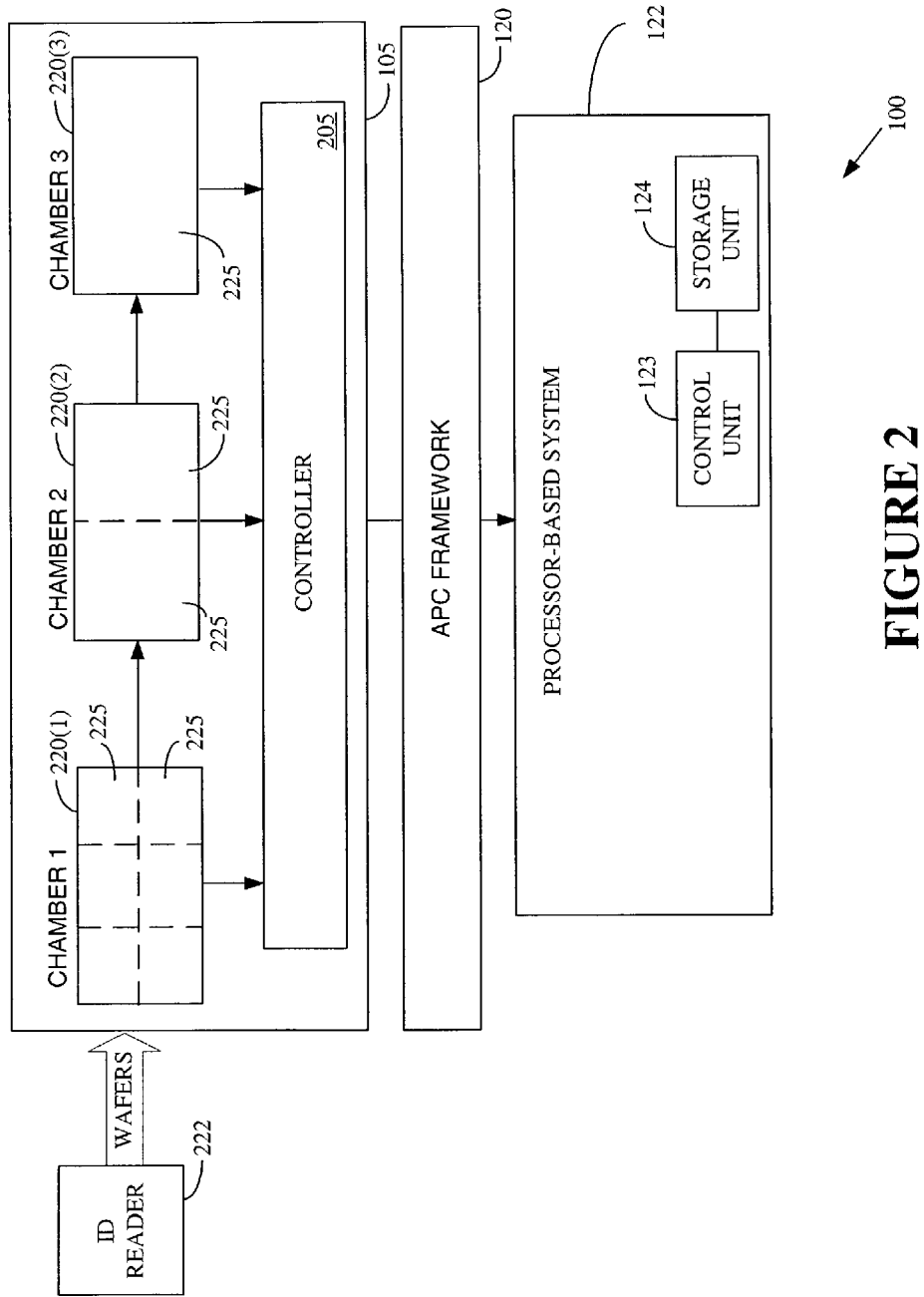
FIG. 2 depicts a block diagram of the manufacturing system of FIG. 1 employing a processing tool, in accordance with one embodiment of the present invention.

Referring now to FIG. 2, a block diagram of the manufacturing system 100, including the processing tool 105, the processor-based system 122, and the APC framework 120, is shown in accordance with one embodiment of the present invention. For ease of illustration, only one processing tool 105 is shown in FIG. 2, although it should be appreciated that in other embodiments more than one processing tool 105 may be employed.

In the illustrated embodiment, the processing tool 105 is shown having a controller 205 for managing the overall operation of the processing tool 105. The processing tool 105 in the illustrated embodiment also includes a plurality (three in this case) of processing chambers 220(1-3). While three processing chambers 220(1-3) are shown in FIG. 2, it should be appreciated that in alternative embodiments, the processing tool 105 may have more or fewer processing chambers 220(1-3). Each processing chamber 220 of the processing tool 105 may perform one or more selected steps of the process as defined by the recipe. The particular type of process steps performed by the processing chambers 220(1-3) depends in part on the type of processing tool 105 employed. For example, a processing tool 105 that is an etching tool may have an etching chamber, a stripping chamber, and a cool down chamber. A deposition tool, for example, may have a pre-depth etching chamber, a TI chemical vapor deposition chamber, and a TIN chemical vapor deposition chamber.

The chambers 220(1-3), in one embodiment, may have one or more chamber zones 225 associated therewith. For example, in the illustrated example of FIG. 2, the first chamber 220(1) has six chamber zones 225, the second chamber 220(2) has two chamber zones 225, and the third chamber 220(3) has one chamber zone 225. The number of zones 225 within the chamber 220 may vary, depending on the particular implementation. It is not necessary that the incoming wafers be subjected to all of the zones 225 within a given chamber 220. The number of zones 225 to which the incoming wafers may be exposed to may depend, in part, on the process step called for by the recipe. An example of a processing tool 105 having one or more chambers 220 includes a furnace tool, where the various "zones" may be temperature zones that are created as the wafer moves away from the heating element of the furnace tool.

The processing tool 105 of FIG. 2 may process a wafer, or, alternatively, a batch of wafers at a given time. Typically, each wafer has at least one identifier (hereinafter referred to as "wafer ID") associated therewith. The processing tool 105, in one embodiment, may have an associated wafer ID reader 222 that is capable of identifying the wafers that enter the processing tool 105. The wafer ID associated with each of the wafers that are processed by the processing tool 105, in one embodiment, is provided to the processor-based system 122.

As is described in more detail below, a variety of information is associated (or tagged) with the wafers that are processed by the processing tool 105. This tagged information, in one embodiment, may be correlated to the processed wafers or a processed lot of wafers and used to improve the semiconductor process. The semiconductor process may be improved, for example, by correlating the tagged information with the information collected from the processed wafers to identify one or more errors that may have caused deviations in the semiconductor process.

Figure 3:
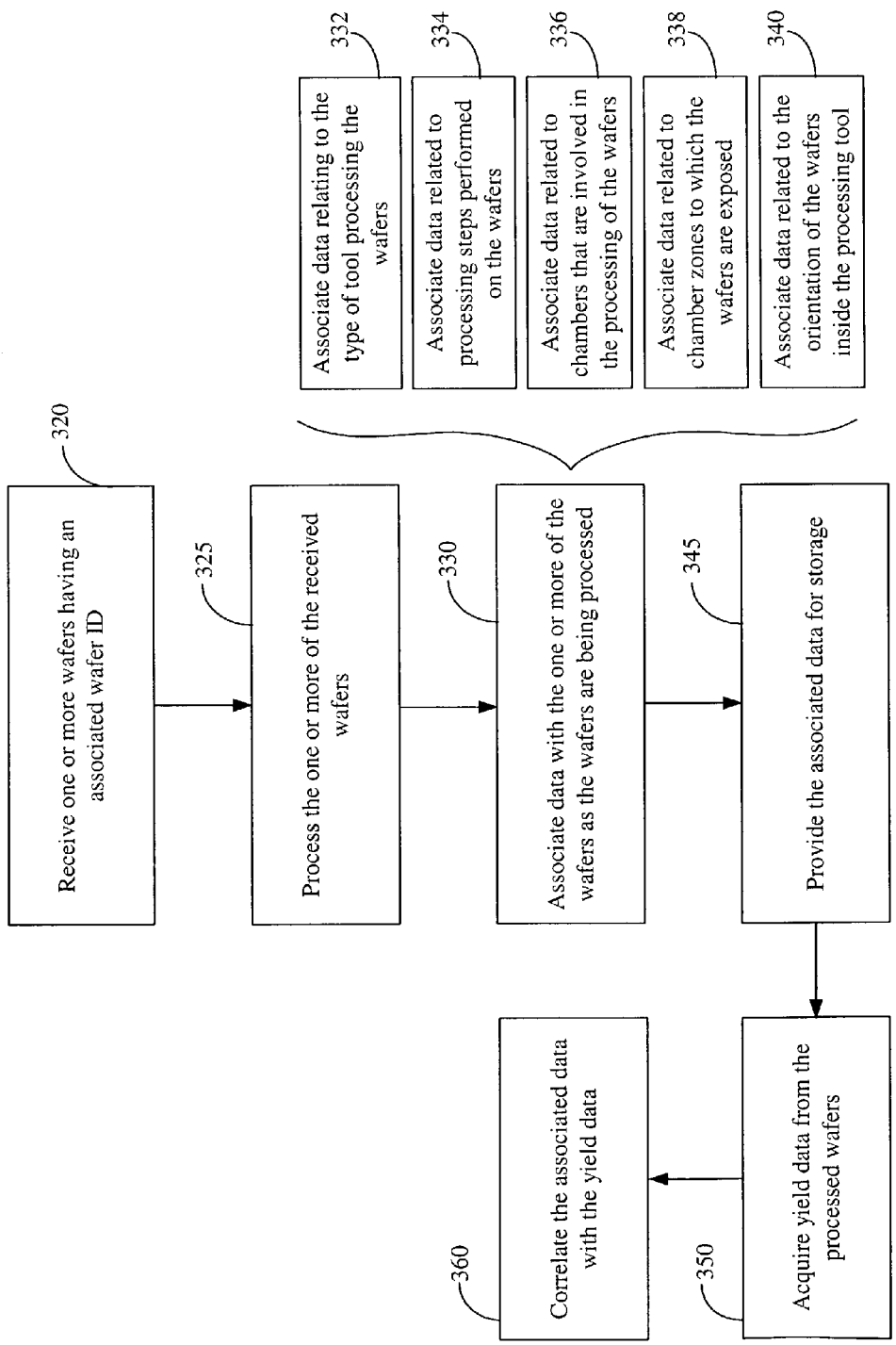
FIG. 3 illustrates a flow diagram of a method that may be implemented in the manufacturing system of FIG. 1 to associate process-related data with workpieces, in accordance with one embodiment of the present invention.

Referring now to FIG. 3, a flow diagram of a method is illustrated, in accordance with one embodiment of the present invention. As shown in FIG. 3, various types of process-related data are collected while the wafers are processed by the processing tools 105(1-n) in the manufacturing system 100. The collected data, in effect, "captures" at least a portion of the environment in which the wafers are processed.

In FIG. 3, the processing tool 105 receives (at 320) one or more wafers having an associated identifier (i.e., wafer ID). In one embodiment, the processing tool 105 may receive and process a batch of wafers. In one embodiment, the entire batch, as opposed to individual wafers, may have an associated ID. The processing tool 105 processes (at 325) the one or more wafers.

The processing tool 105 associates (at 330) process-related data with one or more of the wafers as the wafers are processed by the processing tool 105. As explained below, a variety of process-related data may be associated with (or tagged to) the wafers to preserve the characteristics of the environment in which the wafers are processed. In one embodiment, associating (at 330) the process-related data with the wafers includes associating (at 332) the type of the processing tool 105 (i.e., furnace, sink, implanter) that processes the wafers.

In one embodiment, associating (at 330) the process-related data may include associating (at 334) data related to the various process steps that are performed by the processing tool 105 while processing the wafers during selected times. For example, as the wafers are processed, an implanting tool may perform steps such as beam setup, beam tuning, and implanting. As another example, a rapid thermal anneal processing tool may perform the steps of increasing a control value, such as voltage or temperature, to a preselected value, waiting a preselected interval before increasing the control value to a new preselected value, and detecting if the control value is within a desired range and letting the wafer cook or until the implanted impurities anneal.

In one embodiment, associating (at 330) the process-related data may include associating (at 336) data identifying the chambers 220(1-3) that process the wafers. Tagging chamber-level data to the wafers allows a fab technician to later determine, for example, the particular path the processed wafers traversed.

In one embodiment, associating (at 330) the process-related data may include associating (at 338) data related to the chamber zones 225 of the processing tool 105 through which the wafers traverse as they are processed. It may be desirable to associate chamber zone-information with the wafers for subsequent die-level analysis of the processed wafers. Examples of various types of zones may include temperature zones or track zones. As mentioned, the type and number of zones may vary from one implementation to another, depending on the particular processing tool 105. For instance, in a polishing tool the zones may be defined based on the mechanics of the polishing tool, such as whether the tool polishes sideways along the wafer, circular, and the like.

In one embodiment, associating (at 330) the process-related data may include associating (at 340) data relating to the orientation of the wafer or wafers. This orientation data may aid in reconstructing the relative position of the wafers inside the chamber zones 225 when the wafers were processed by the processing tool 105. Thus, the orientation information may identify which portions of a wafer were exposed to which chamber zones 225 during processing. Typically, each wafer has a zero point of the wafer (i.e., the notch on the wafer) that defines its orientation. Associating wafer-orientation information with the wafers may be useful for subsequent die-level analysis of the processed wafers.

The controller 205 of the processing tool 105 provides (at 345) the data associated (at 330) to the processor-based system 122 through the APC framework 120 for storage in the storage unit 124. The stored data may be readily accessed from the storage unit 124 of the processor-based system 122 for later use.

In one embodiment, a fab technician may acquire (at 350) yield data from the wafers that are processed by the processing tools 105(1-n) of the manufacturing system 100. The yield data may be acquired (at 350) in any conventionally acceptable manner, and, in one embodiment, may be stored in the storage unit 124 of the processor-based system 122. In an alternative embodiment, the process of acquiring the yield data (at 350) may be an automated process. For example, in one embodiment, the processor-based system 122 may execute one or more routines to obtain the yield data associated with the processed wafers.

In one embodiment, the data that was associated with the wafers during processing (at 330) is correlated (at 360) with the yield data that is acquired (at 350) from the processed wafers. Although not so limited, in one embodiment, the processor-based system 122 may be utilized to correlate (at 360) the collected data. Correlating the tagged data (at 360) with the yield data may be done for a variety of reasons, including identifying one or more sources that may have caused deviations in the semiconductor process or predicting yield impact. It may be possible to predict yield impact, for example, if an aberration in the processing of the wafer results in a particular, quantifiable yield. For instance, if there are more than 5 degrees of overshoot in an RTA process that results in a yield roll off in the final product, then through data correlation it may be possible to predict yield impact in the future whenever there is an overshoot of 5 degrees or more in the RTA process. Similarly, other types of yield impacts may be predicted based on correlating the tagged data with the yield data. The ability to predict yield impact may allow fab technicians to refine the manufacturing process to obtain better results.

The various system layers, routines, or modules may be executable by the control units 121, 123 (see FIG. 1). As utilized herein, the term "control unit" may include a microprocessor, a microcontroller, a digital signal processor, a processor card (including one or more microprocessors or controllers), or other control or computing devices. The storage unit 124 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

processing a work piece using a processing tool, wherein the processing comprises actively performing at least one of implanting, photolithography stepping, etching, deposition, polishing, rapid thermal processing, or doping;

associating, using a control unit, operational data and work piece metrology data with the work piece during the processing of the work piece, wherein the operational data comprises data relating to at least one of a chamber of the processing tool and a chamber zone of the processing tool that processes the work piece, wherein associating the operational data comprises associating data related to an orientation of the work piece inside the processing tool;

storing the associated operational data and work piece metrology data in a storage unit;

measuring, using a measuring tool, yield data associated with the work piece processed by the processing tool; and correlating the stored operational data and work piece metrology data with the yield data to make one or more determinations, wherein at least one of said one or more determinations is at least one of:

identifying which portions of the work piece were exposed to which chambers of the processing tool during processing; and identifying which portions of the work piece were exposed to which chamber zones of the processing tool during processing.

2. The method of claim 1, the work piece having an associated identifier, wherein associating the operational data comprises associating data related to at least one of a type of processing tool and a recipe process performed on the work piece with the identifier of the work piece.

3. The method of claim 2, wherein associating the operational data comprises associating data related to an orientation of the work piece inside the processing tool.

4. The method of claim 3, wherein associating the data related to the orientation of the work piece comprises associating the data related to the orientation of the work piece inside a chamber of the processing tool.

5. A method, comprising:

processing a work piece using a processing tool, wherein the processing comprises actively performing at least one of implanting, photolithography stepping, etching, deposition, polishing, rapid thermal processing, or doping;

associating, using a control unit, operational data and work piece metrology data with the work piece during the processing of the work piece, wherein associating the operational data comprises associating data related to an orientation of the work piece inside the processing tool;

measuring, using a measuring tool, yield data associated with the work piece processed by the processing tool;

correlating the operational data and work piece metrology data with the yield data to make one or more determinations, wherein at least one of said one or more determinations is at least one of:

identifying which portions of the work piece were exposed to one or more chambers of the processing tool during processing; and identifying which portions of the work piece were exposed to one or more chamber zones of the processing tool during processing, and wherein processing the work piece comprises processing a plurality of wafers and wherein associating the operational data and work piece metrology data with the work piece comprises associating the operational data and work piece metrology data on a wafer by wafer basis for each of the plurality of the wafers.

6. The method of claim 1, wherein correlating the operational data and work piece metrology data with the yield data comprises correlating the operational data and work piece metrology data with the yield data to predict yield impact on the processed work piece.

7. The method of claim 1, further comprising detecting a process deviation in the yield data, and wherein correlating the operational data and work piece metrology data with the yield data comprises correlating the operational data and work piece metrology data with the yield data to identify a cause of the process deviation in the yield data.

8. The method of claim 5, further comprising storing the operational data and work piece metrology data in a storage unit.

9. An apparatus, comprising:

an interface adapted to:

receive operational data and work piece metrology data associated with a work piece, wherein the work piece is processed by a processing tool, wherein processing comprises actively performing at least one of implanting, photolithography stepping, etching, deposition, polishing, rapid thermal processing, or doping, wherein the operational data comprises data relating to at least one of a chamber of the processing tool and a chamber zone of the processing tool that processes the work piece, and wherein the associated operational data comprises data related to an orientation of the work piece inside the processing tool;

receive yield data associated with the processed work piece;

a control unit communicatively coupled to the interface, the control unit adapted to store the associated operational data and work piece metrology data in a storage unit; and correlate the operational data and work piece metrology data with the yield data to make one or more determinations, wherein at least one of said one or more determinations is at least one of:

identifying which portions of the work piece were exposed to which chambers of the processing tool during processing; and identifying which portions of the work piece were exposed to which chamber zones of the processing tool during processing.

10. The apparatus of claim 9, wherein the interface is adapted to receive the operational data relating to at least one of a type of processing tool and a recipe process performed on the work piece with an identifier of the work piece.

11. The apparatus of claim 9, wherein the interface is adapted to further receive operational data relating to an orientation of the work piece inside the processing tool.

12. The apparatus of claim 9, wherein the control unit is adapted to correlate the operational data and work piece metrology data with the yield data to predict yield impact on the processed work piece.

13. The apparatus of claim 9, wherein the control unit is adapted to correlate the operational data and work piece metrology data with the yield data to identify a cause of process deviation detected in the yield data.

14. An article comprising one or more machine-readable storage media containing instructions that when executed enable a processor to:

process a wafer using a processing tool, wherein the act of processing comprises actively performing at least one of implanting, photolithography stepping, etching, deposition, polishing, rapid thermal processing, or doping;

associate operational data and work piece metrology data with the wafer during the processing of the wafer, wherein the operational data comprises data relating to at least one of a chamber of the processing tool and a chamber zone of the processing tool that processes the wafer, wherein the associating comprises associating data related to an orientation of the wafer inside the processing tool;

store the associated operational data and work piece metrology data in a storage unit;

measure, using a measuring tool, yield data associated with the wafer processed by the processing tool; and correlate the operational data and work piece metrology data with the yield data to determine yield impact on the processed wafer, wherein determining the yield impact comprises at least one of:

identifying which portions of the wafer were exposed to which chambers of the processing tool during processing; and identifying which portions of the wafer were exposed to which chamber zones of the processing tool during processing.

15. The article of claim 14, wherein the instructions when executed enable the processor to associate data related to at least one of a type of processing tool and a recipe process performed on the wafer with an identifier of the wafer.

16. The article of claim 15, wherein the instructions when executed enable the processor to associate data related to an orientation of the wafer inside the processing tool.

17. The article of claim 14, wherein the instructions when executed enable the processor to process a plurality of wafers and associate the operational data and work piece metrology data with the plurality of the wafers.

18. The article of claim 14, wherein the instructions when executed enable the processor to identify a cause of process deviation detected in the yield data.

19. A system, comprising:
a processing tool adapted to:
process a wafer, wherein the act of processing comprises actively performing at least one of implanting, photolithography stepping, etching, deposition, polishing, rapid thermal processing, or doping;
associate operational data and work piece metrology data with the wafer during the processing of the wafer, wherein the operational data comprises data relating to at least one of a chamber of the processing tool and a chamber zone of the processing tool that processes the wafer, and wherein associating the operational data comprises associating data related to an orientation of the wafer inside the processing tool; and
provide the operational data and work piece metrology data;
a measurement tool, communicatively coupled to the processing tool, the processor-based system adapted to measure yield data associated with the wafer processed by the processing tool and provide the yield data; and
a processor-based system communicatively coupled to the processing tool, the processor-based system adapted to:
receive the operation operational data, the work piece metrology data and the yield data;
detect a process deviation in the processed wafer;
correlate the operational data and work piece metrology data with the yield data to determine yield impact on the processed wafer; and
identify a source of the process deviation based on at least one of the received operational data or work piece metrology data, wherein said identification comprises at least one of:
identifying which portions of the wafer were exposed to which chambers of the processing tool during processing; and
identifying which portions of the wafer were exposed to which chamber zones of the processing tool during processing.

20. The system of claim 19, further comprising an advanced processing control framework coupled between the processor-based system and the processing tool.

21. An apparatus, comprising:
means for processing a work piece using a processing tool, wherein processing comprises actively performing at least one of implanting, photolithography stepping, etching, deposition, polishing, rapid thermal processing, and doping;
means for associating operational data and work piece metrology data with the work piece during the processing of the work piece, wherein the operational data comprises data relating to at least one of a chamber of the processing tool and a chamber zone of the processing tool that processes the work piece, wherein associating the operational data comprises associating data related to an orientation of the work piece inside the processing tool;
means for storing the associated operational data and work piece metrology data in a storage unit;
means for measuring yield data associated with the processed work piece; and
means for correlating the stored operational data and work piece metrology data with the yield data to make one or more determinations relating to the effect of at least one process parameter upon a yield, wherein at least one of said one or more determinations is at least one of:
identifying which portions of the work piece were exposed to which chambers of the processing tool during processing; and
identifying which portions of the work piece were exposed to which chamber zones of the processing tool during processing.

* * * * *